Figure 1:
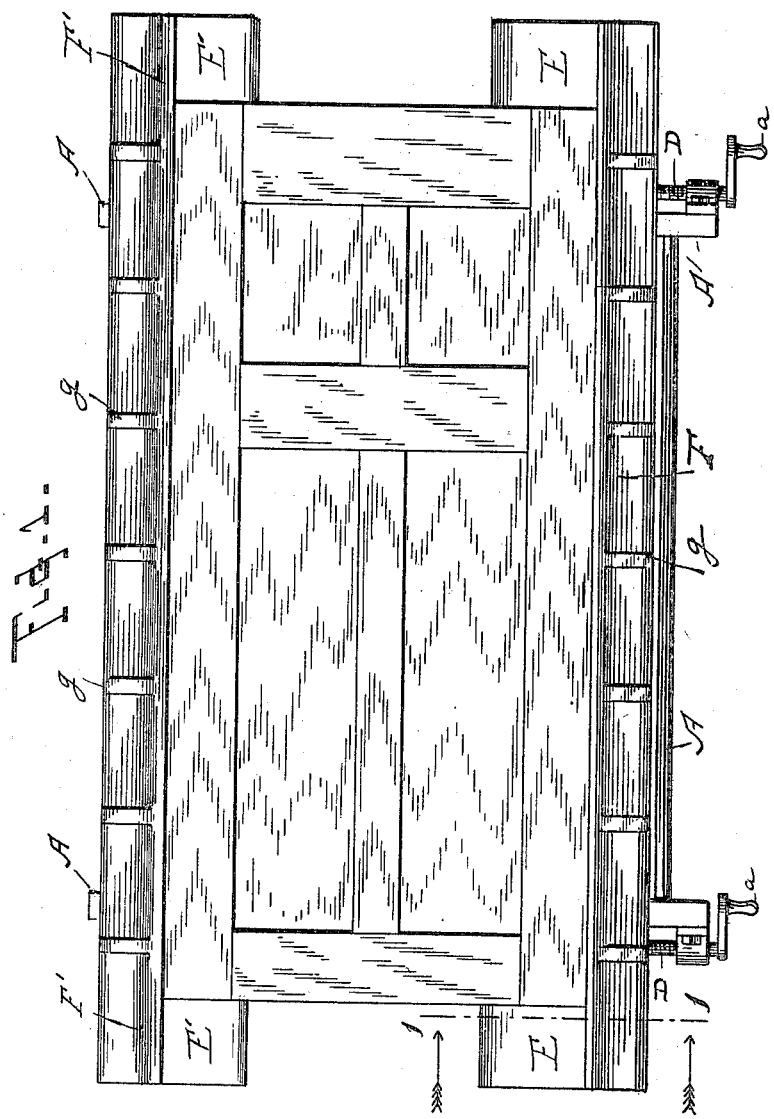

No. 680,859. Patented Aug. 20, 1901.
A. HASSLER & J. T. WATTERS.
CLAMPING APPARATUS.
(Application filed Nov. 10, 1898.)

(No Model.) 6 Sheets—Sheet 1.

Witnesses
E. W. Stone
A. G. Krause

Inventors
Anton Hassler
John T. Watters
per A. S. Paré
Attorney.

THE NORRIS PETERS CO., PHOTO-LITHO., WASHINGTON, D. C.

No. 680,859. Patented Aug. 20, 1901.
A. HASSLER & J. T. WATTERS.
CLAMPING APPARATUS.
(Application filed Nov. 10, 1898.)
(No Model.) 6 Sheets—Sheet 2.

Witnesses
E. W. Stone
A. G. Krause.

Inventors
Anton Hassler and
John T. Watters
per A. S. Pace
Attorney

No. 680,859. Patented Aug. 20, 1901.
A. HASSLER & J. T. WATTERS.
CLAMPING APPARATUS.
(Application filed Nov. 10, 1898.)
(No Model.) 6 Sheets—Sheet 3.

Witnesses
E. W. Stone
A. G. Krause.

Inventors
Anton Hassler
John T. Watters
per A. S. Paré
Attorney

No. 680,859. Patented Aug. 20, 1901.
A. HASSLER & J. T. WATTERS.
CLAMPING APPARATUS.
(Application filed Nov. 10, 1898.)
(No Model.) 6 Sheets—Sheet 4.

Witnesses
E. W. Stone
A. G. Krause

Inventors
Artour Hassler
John T. Watters
by A. S. Paré
Attorney

No. 680,859. Patented Aug. 20, 1901.
A. HASSLER & J. T. WATTERS.
CLAMPING APPARATUS.
(Application filed Nov. 10, 1898.)
(No Model.) 6 Sheets—Sheet 5.
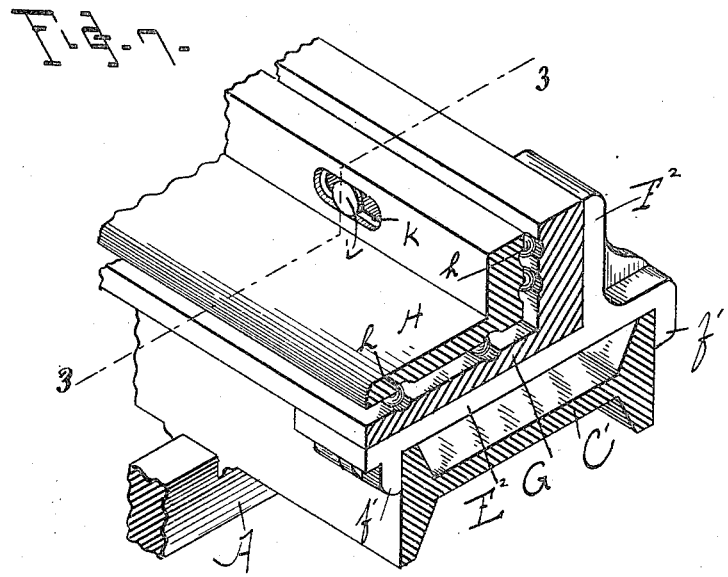
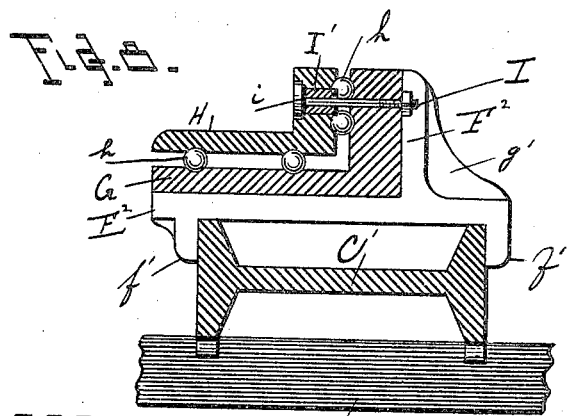
Witnesses
E. W. Stone
A. G. Krause
Inventors
Anton Hassler
John T. Watters
 by A. S. Paré
 Attorney No. 680,859. Patented Aug. 20, 1901.
A. HASSLER & J. T. WATTERS.
CLAMPING APPARATUS.
(Application filed Nov. 10, 1898.)
(No Model.) 6 Sheets—Sheet 6.
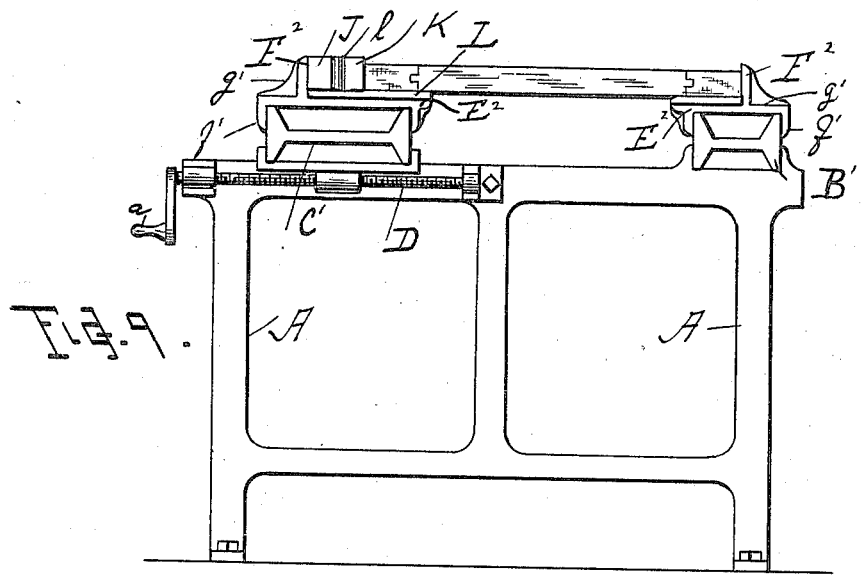
Fig. 9.
Fig. 10.
Fig. 11.
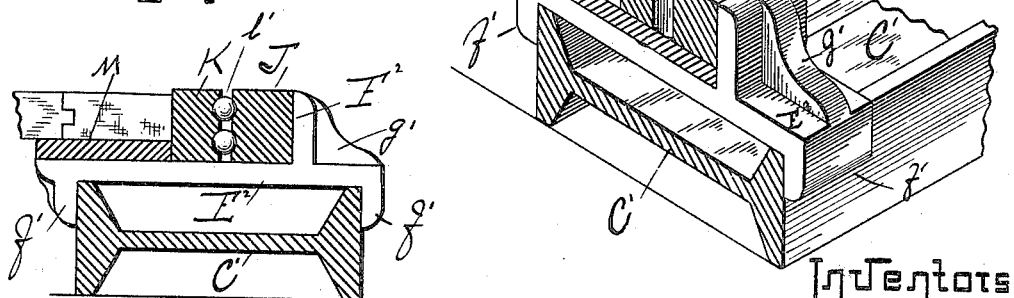
Fig. 12.
Witnesses
E. W. Stone
V. G. Krause
Inventors
Anton Hassler
John T. Watters
by A. S. Paré
Attorney
THE NORRIS PETERS CO., PHOTO-LITHO., WASHINGTON, D. C.

UNITED STATES PATENT OFFICE.

ANTON HASSLER AND JOHN T. WATTERS, OF OAKLAND, CALIFORNIA.

CLAMPING APPARATUS.

SPECIFICATION forming part of Letters Patent No. 680,859, dated August 20, 1901.

Application filed November 10, 1898. Serial No. 696,072. (No model.)

*To all whom it may concern:*

Be it known that we, ANTON HASSLER and JOHN T. WATTERS, citizens of the United States, and residents of Oakland, county of Alameda, and State of California, have invented certain new and useful Improvements in Clamping Apparatus; and we do hereby declare the following to be a full, clear, and exact description of said invention, such as will enable others skilled in the art to which it most nearly appertains to make, use, and practice the same.

Our invention relates to improvements in that class of apparatus known as "clamping-machines" for doors, sashes, blinds, &c., and for the purpose of this application we will refer hereinafter to a machine particularly adapted for door-frames.

While clamping together the various parts of a door-frame the rails, which are supposed to fit at right angles with the styles, are very often not properly set, and if clamped in such a way the frame has to be taken apart or cast away, as the case may be.

The object of our invention is to obviate such inconvenience and to provide simple and ever-ready means whereby the rails and styles can be properly adjusted while clamping the frame.

To this end our invention consists in providing clamping-machines with an adjustable work-seat and clamping-jaws, as will be more fully described hereinafter.

Reference is had to the accompanying drawings, which form part of the following description, in which—

Figure 2:
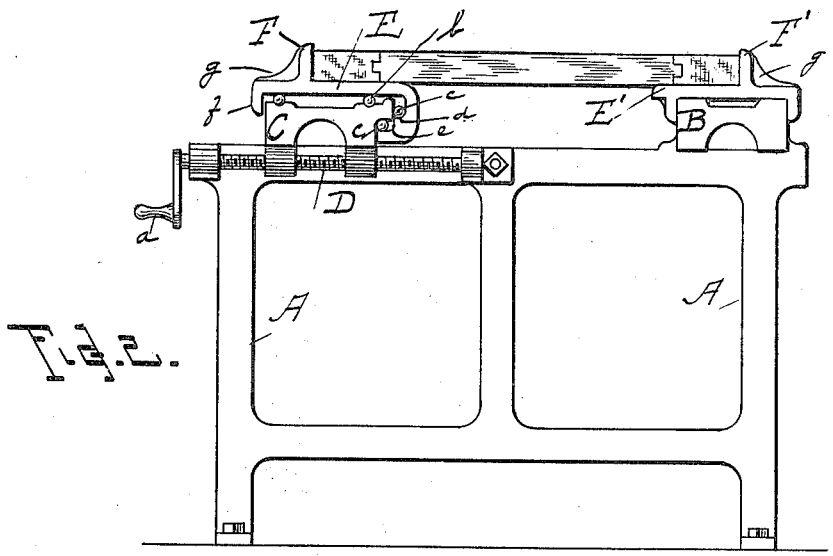
Figure 3:
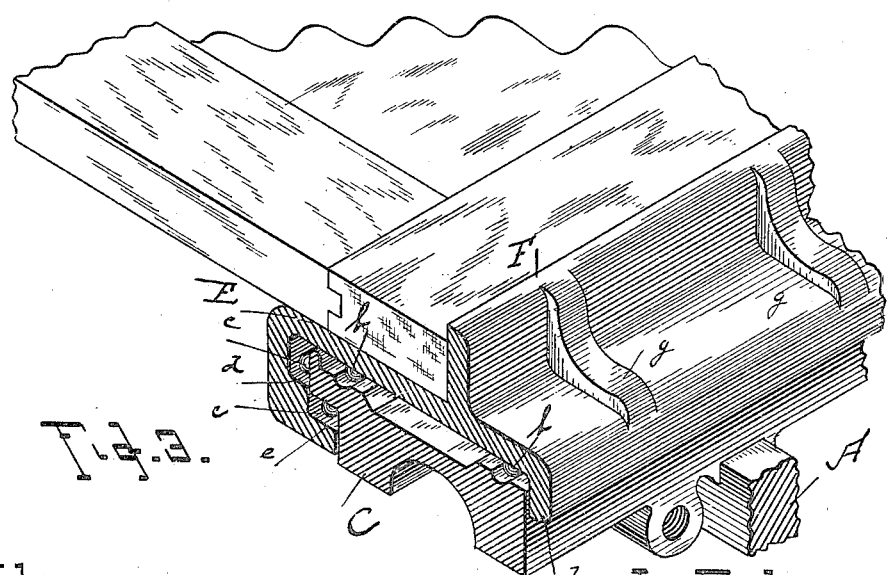
Figure 4:
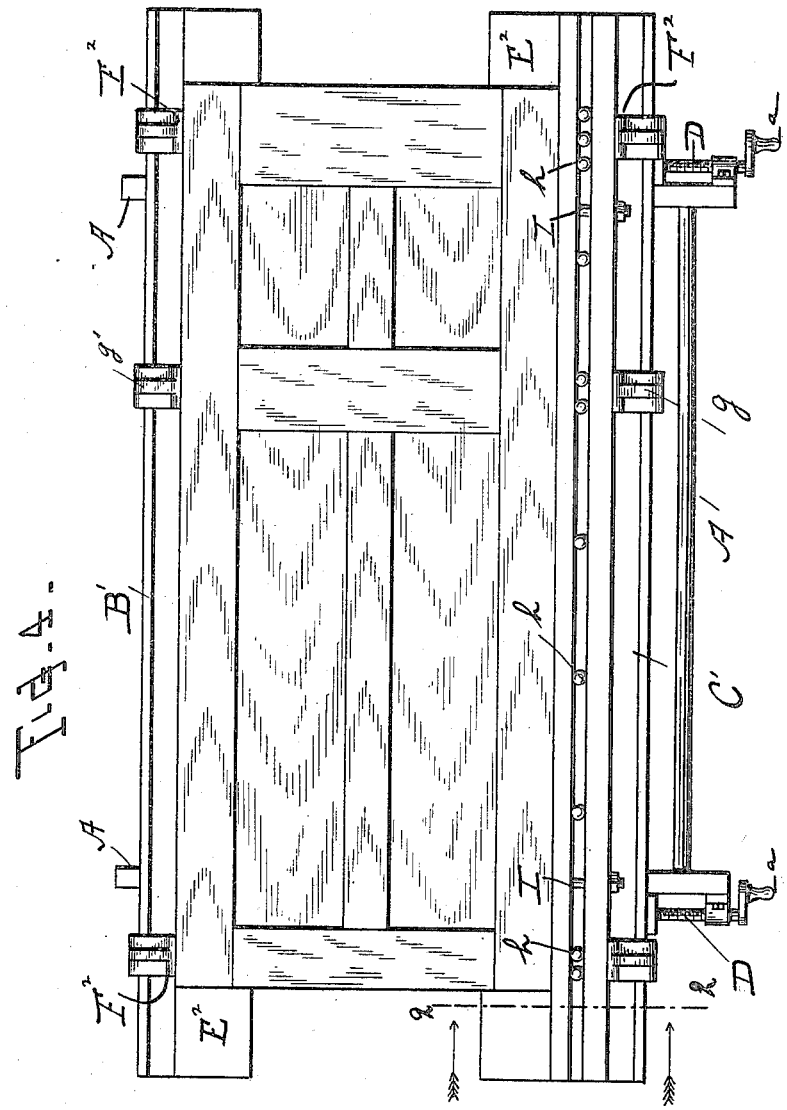
Figure 5:
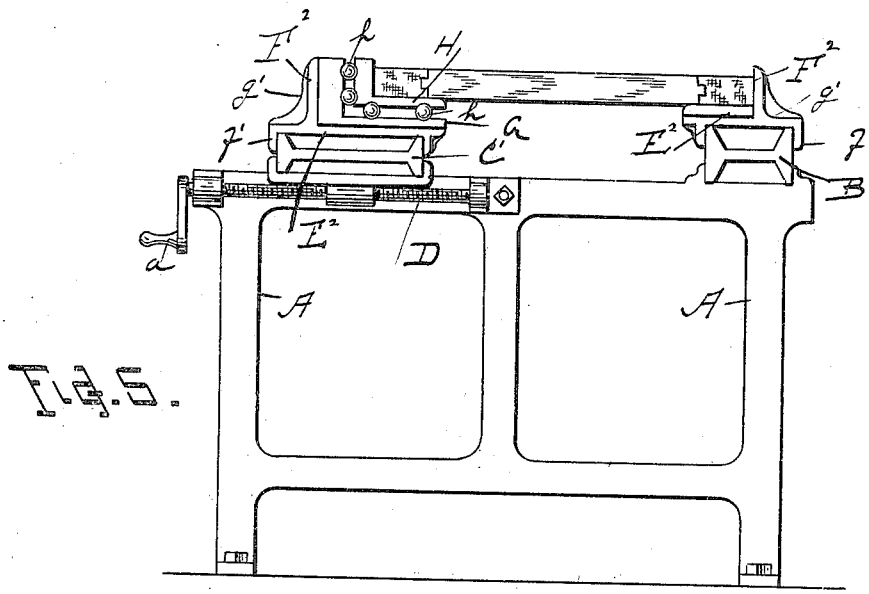
Figure 6:
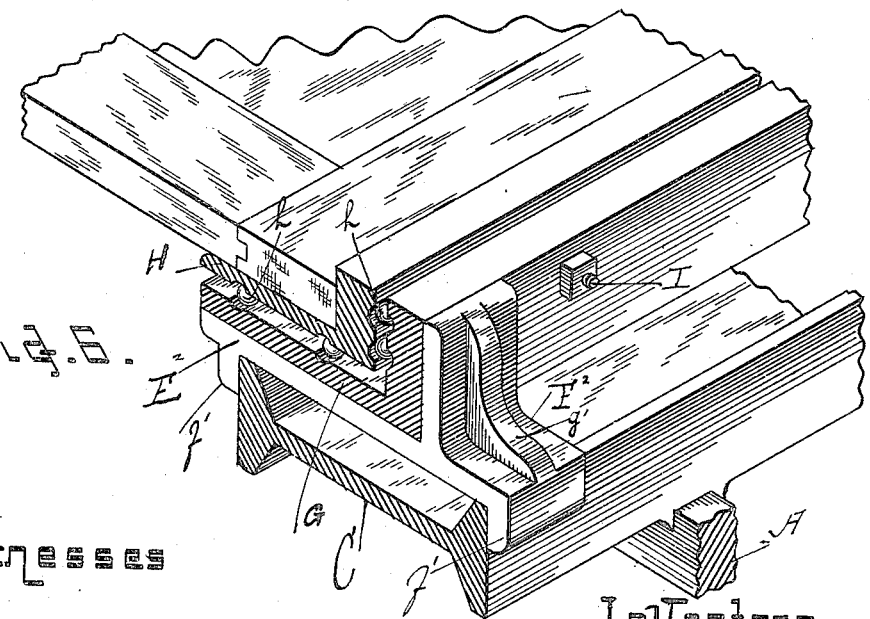

Figure 1 represents the top view of an ordinary clamping-machine, showing the frame of a door and our improvements in position. Fig. 2 is a right end elevation of Fig. 1. Fig. 3 is a broken isometrical projection taken from dotted line 1 to 1 of Fig. 1 looking in the direction of the arrows. Figs. 4, 5, 6, 7, 8, 9, 10, 11, and 12 illustrate various ways of constructing our invention and may be described as follows: Fig. 4 is a top plan view of an ordinary clamping-machine provided with our invention in modified form. Fig. 5 is a right end elevation of Fig. 4. Fig. 6 is a broken isometrical projection taken from dotted line 2 to 2 of Fig. 4 looking in the direction of the arrows. Fig. 7 is an isometrical projection showing a different position of Fig. 6. Fig. 8 is a broken cross-section taken from dotted line 3 to 3 of Fig. 7. Fig. 9 is an end elevation similar to Figs. 2 and 5 of a third form of our invention. Fig. 10 is an isometrical broken projection similar to Figs. 3 and 6. Fig. 11 is an isometrical projection of one of the bearings by which the work-seat can be adjusted, and Fig. 12 is a cross-elevation similar to Fig. 10.

Similar letters refer to similar parts throughout the drawings.

In the class of machines to which our improvements relate it is usual to provide a suitable frame A, the stationary rail B, and the movable and adjustable rail C, both horizontally mounted upon the frame, the worm-screws D, provided with suitable cranks $a$, by which the rail C is moved, and the work-seats E E', provided with parallel jaws or clamping-backs F F', mounted upon the rails B and C. To provide such machine with our improvements, referring now to Figs. 1 to 3, exclusively, we place between the bearing-faces of the work-seat E and the rail C anti-friction-balls $b$, upon which the work-seat is supported, so that the latter can freely move longitudinally and set the door-frame in proper position while clamping the same. The balls $b$ are preferably seated in suitable grooves cut for that purpose upon the upper bearing-face of the rail C, while the balls $c$ are held in place against the bearing side of the rail by means of shoulders $d$ and $e$, made by the inner downward and inwardly turn of the work-seat E and the outward-projecting edge of the rail C, which form an independent upper and lower receptacle. However, the upper receptacle may be dispensed with, if desired, as the balls of the lower receptacle could be adapted for all purposes. Each work-seat, with its respective jaw or clamping-back, is cast, preferably, in one piece and of the entire length of the rail, as particularly shown in Fig. 1 and partially in Fig. 3. In this manner better adjustment of the door-frame can be obtained. It is apparent that the antifriction-balls may be placed upon the bearing-face of either rails B or C. However, it is preferable to construct only one longitudinally-adjustable work-seat in the manner previously described. The work-seats are provided also with downward projections $f$, lapping outwardly their respective rail to prevent them from shifting out when once in position, and the jaws or clamping-backs F F' are provided with a series of ribs $g$ to reinforce them.

To carry out successfully our invention, the various parts composing the door-frame are first properly assembled together by hand or other accurate means and placed upon the work-seats E and E', and while the rail C is forced forward by means of the worm-screws D the adjustable work-seat E will move laterally toward the least resistance, if any, and carry that side of the frame with it, while the other side remains stationary upon the work-seat E'. Thus by this method the rails and styles can be adjusted at right angles, if they should not be properly set.

We have illustrated in Figs. 4 to 8 and 9 to 12 two different forms of constructing our invention and the one already described, and it will be readily seen while glancing over the drawings that our improvements can be quickly adapted to existing clamping-machines without the slightest alteration by providing upon one of the work-seats two horizontal angle-plates G and H, projecting parallel to the usual jaw or clamping-back of the work-seat proper, and antifriction balls or rollers placed between the plates. Thus in this manner we have provided an ordinary machine with an adjustable work-seat. However, while remodeling an old machine or constructing a new one the work-seats proper may be substituted with better advantage by series of brackets $E^2$, having rectangular outward-projecting back $F^2$, provided with the usual rib $g'$, and may be held in position upon the rails B' and C' by means of downward projections $f'$ lapping the rails. These brackets are particularly shown in the drawings from Figs. 4 to 12, while the two horizontal angle-plates G and H appear only in Figs. 4 to 8, where it will be seen that plate G is horizontally mounted upon one series of brackets and rests against their rectangular projecting backs, and the plate H is supported upon plate G by means of balls $h$, seated in a suitable groove cut upon the meeting faces of the two plates. Thus in this manner the plate H becomes the adjustable work-seat proper, while its rectangular back forms the jaw or clamping-back previously described. To carry out our object successfully, it is preferable to permanently secure the plate G upon the brackets and to provide plate H with proper means or guides to prevent the same from shifting away. In Figs. 7 and 8 we have shown convenient means for that purpose, which consists of bolt I, secured at one end to the rectangular projecting back of plate G, while the other end is provided with a flat head $i$ and antifriction-roller I', working freely within an elongated slot $k$, cut upon the rectangular projecting back of plate H. The head $i$ of the bolt is countersunk, so that a smooth surface can be had upon the outer side of the rectangular back of plate H.

Figs. 9 to 12 illustrate a third form of constructing the work-seats, which consists in placing horizontally upon the brackets, previously described, a stationary board or plate L, upon which a horizontal stationary bar J is mounted and rests against the projecting backs of the brackets. Upon the board L and placed parallel to the stationary bar J is a horizontal movable bar K, held in position by means of antifriction-rollers $l$, placed vertically between the meeting sides of the bars. Thus arranged the bar K constitutes substantially our adjustable clamping-back while in operation. The rollers $l$ just described may be substituted, if desired, by balls $l'$, seated in grooves cut upon the meeting sides of the bars, as shown in Fig. 12. In this case the board L may be dispensed with and the bar K may be held in position by means of locking-plate M, secured or otherwise bolted to the brackets.

It will be readily perceived from the above description and reference to the drawings annexed that our improvements could be used for clamping box-stuffs as well as door-frames by simply doubling at a right angle our stationary and moving clamping-jaws, which can be operated in the manner and by the means previously described.

Believing we have produced a convenient and ever-ready means by which doors, sashes, blinds, &c., can be adjustably set, while clamping the same, and having described fully our invention, what we claim as new, and desire to secure by United States Letters Patent, is—

1. In a machine for clamping doors and the like, the combination of parallel clamping-jaws suitably supported, and means for adjusting the distance between them, one of said jaws being freely movable longitudinally of its support, substantially as described.

2. In a machine for clamping doors and the like, the combination of parallel clamping-jaws suitably supported, and means for moving one of said jaws toward or from the other; one of said jaws being freely movable longitudinally on its support, substantially as described.

3. In a machine for clamping doors and the like, the combination with parallel clamping-jaws suitably supported, means for adjusting the distance between them, one of said jaws being freely movable longitudinally on its support, and antifriction devices interposed between the adjustable jaw and its support, substantially as described.

4. In a machine for clamping doors and the like, the combination with parallel clamping-jaws suitably supported, means for moving one of said jaws toward and from the other, one of said jaws being freely movable longitudinally on its support and antifriction devices interposed between the adjustable jaw and its support, substantially as described.

5. In a machine for clamping doors and the like, the combination with parallel supporting-rails, and means for adjusting the distance between them, of work-seats mounted on said rails and carrying clamping-jaws, one of said work-seats being freely movable longitudinally on its supporting-rail, substantially as described.

6. In a machine for clamping doors and the like, the combination with two parallel supporting-rails, and means for moving one of said rails toward and from the other, of parallel clamping work-seats mounted on said rails, one of said work-seats being freely movable longitudinally on its supporting-rail, substantially as described.

7. In a machine for clamping doors and the like, the combination with two parallel supporting-rails, and means for adjusting the distance between them, of parallel clamping work-seats mounted on said rails, one of said work-seats being freely movable longitudinally on its support, and antifriction devices interposed between the adjustable work-seat and its supporting-rail, substantially as described.

8. In a machine for clamping doors and the like, the combination with two parallel supporting-rails, and means for moving one of said rails toward and from the other, of parallel clamping work-seats mounted on said rails, one of said work-seats being freely movable longitudinally on its supporting-rail, and antifriction devices interposed between the adjustable work-seat and its supporting-rail, substantially as described.

9. In a machine for clamping doors and the like, the combination of parallel clamping-jaws suitably supported, means for adjusting the distance between them, one of said jaws being freely movable longitudinally on its support, and guides connecting the adjustable jaw with its support, substantially as described.

10. In a machine for clamping doors and the like, the combination of parallel clamping-jaws, means for adjusting the distance between them, an angle-plate fixed to one of said jaws, a longitudinally-movable angle-plate mounted thereon, and antifriction devices interposed between said angle-plates, substantially as described.

11. In a machine for clamping doors and the like, the combination of clamping-jaws, means for varying the distance between them, an angle-plate fixed to one of said jaws, a longitudinally-movable angle-plate mounted thereon, antifriction devices interposed between said plates, and guides connecting the said plates, substantially as described.

In testimony whereof we have affixed our signatures, in presence of two witnesses, this 8th day of October, A. D. 1898.

ANTON HASSLER.
JOHN T. WATTERS.

In presence of—
J. G. RAPHAEL,
M. P. FOX.